United States Patent Office 3,645,930
Patented Feb. 29, 1972

3,645,930
EXPANDABLE COMPOSITIONS AND PRODUCTS
James K. Normanton, Bishop Auckland, Durham, England, assignor to Bakelite Xylonite Limited
No Drawing. Filed July 22, 1969, Ser. No. 843,767
Claims priority, application Great Britain, July 19, 1968, 34,510/68
Int. Cl. C08f 29/04, 47/10; B44d 1/42
U.S. Cl. 260—2.5 E                   7 Claims

ABSTRACT OF THE DISCLOSURE

Azodicarbonamide is used with a second organic blowing agent to form cellular ethylene polymer products adaptable for electrical conductor insulation.

BACKGROUND OF THE INVENTION

(1) Field of the invention

This invention relates to compositions useful in insulating electrical conductors such as wires intended for electrical applications. More particularly, the invention is concerned with ethylene polymer based compositions which, on extrusion around wire, provide a cellular covering serving to insulate the wire, to methods for extruding the compositions around the wire, and the insulated wire so-obtained.

(2) Description of the prior art

Ethylene polymer based compositions are used extensively in the covering of wires intended for electrical applications because, among other things, they possess good electrical insulating properties, reflecting their low dielectric loss and high insulating resistance, good wearing properties and, in the form of low density ethylene polymer, can be readily extruded around the wire. In order to reduce the weight of these ethylene polymer based coverings, and also to improve their suitability for electrical applications (because of a decrease in the capacitance which approaches very nearly to that of the air-spaced wire conductors), it is known to expand the ethylene polymer based compositions so as to provide an insulation covering in cellular form. The expansion of the ethylene polymer based composition is conveniently accomplished chemically by incorporating a substance which, when decomposed by heat, evolves a gas such as $CO_2$, $N_2$ or $N_2O$. The chemical substances used for this purpose are commonly referred to in this art as blowing agents, which term is used hereinafter. In a commonly used method for producing the cellular insulation covering, the ethylene polymer based composition containing a suitable blowing agent is introduced into a screw extruder in which the composition is heated, usually at a temperature in the range 150 to 250° C., under pressure before being extruded through an extrusion die, and applied around a centrally disposed wire, say a copper wire. The decomposition of the blowing agent normally commences in the extruder but, because of the pressure maintained within the extruder, complete expansion does not take place until the polymer based composition emerges from the die and condenses around the wire.

There are a wide variety of chemical blowing agents disclosed in the prior art which have been proposed for use in expanding ethylene polymers, such as low density polyethylene. These include inorganic compounds such as sodium bicarbonate, and organic compounds such as azo compounds, for instance, azodicarbonamide, all of which compounds are capable of liberating gases at their decomposition temperature.

While a fair number of blowing agents are currently available, it is our experience that there are difficulties and disadvantages in applying these materials to the production of cellular insulation coverings derived from ethylene polymers.

Thus, for instance, azodicarbonamide, a blowing agent which is extensively used because (a) its decomposition temperature in an ethylene polymer based composition is around the usual processing temperature, (b) it gives a product with a good cellular structure, (c) it is readily available, and (d) it has an excellent expanding power, gives rise to undesirable decomposition products which adversely affect both the processing of the compositions, and the cellular product itself. In particular, the decomposition is accompanied by the deposition of a residue on the internal parts of the extruder such as the channels, screw flights and screw tip. The residue, which is believed to result from the inter-action between the decomposition products, consisting essentially of cyanuric acid, and the metal constituting the surfaces, forms as a coloured crust on the extruder parts. The phenomenon is known in the art as "plate-out." Ultimately, the residue interferes with the extrusion process so that it is necessary to clean the parts of the extruder at periodic intervals, and this not only interrupts the processing schedule (with a corresponding loss in productivity), but is time-consuming and tedious. Further, the residue itself contaminates the product, and results in extruded profiles having impaired surface characteristics. Surface roughness, typified by crested and peaked waviness easily perceived by touch or sight, renders the insulated wire unattractive and unsalable.

Other blowing agents, such as p,p'-oxy-bis(benzene sulphonyl hydrazide) and trihydrazino-sym-triazine, do not provide the cellular covering with the small, fine and uniform cell structure which is sought.

SUMMARY OF THE INVENTION

An ethylene polymer based composition useful for electrical conductor insulation and formed from a blend of specific polymers is blown with a blowing agent comprising azodicarbonamide and certain second organic blowing agents.

An object of the present invention is to provide expandable ethylene polymer based compositions for electrical conductor insulation which are readily processed and which have, in expanded form, a markedly reduced incidence of "plate-out."

Other objects of the present invention are to provide such expanded products and the process for preparing the same.

DESCRIPTION OF THE PREFERRED EMBODIMENT

In accordance with the present invention, it has now been found that expandable ethylene polymer based compositions with good processing properties on extrusion, especially a markedly reduced incidence of "plate-out," and which provide improved cellular insulation coverings, can be obtained using a novel blowing agent system.

In one of its aspects, therefore, this invention provides an expandable ethylene polymer based composition which includes ethylene polymer and a mixture of blowing agents comprising a major proportion by weight of (i.e. >50% by weight) azodicarbonamide as a primary blowing agent, and a minor proportion by weight of (i.e. <50% by weight) one or more secondary blowing agents. The secondary blowing agent or agents are organic compounds which decompose on heating to evolve gaseous products containing elemental nitrogen and have a higher decomposition temperature than azodicarbonamide. Desirably, the compositions include one or more additional components as will be discussed in more detail hereinafter.

The invention further includes, in another of its aspects, a method for providing a wire or other electrical conductor with a cellular insulation covering which comprises heating the above described expandable composition at a temperature in the range 200–250° C. under pressure, extruding it, at about atmospheric pressure, onto and around the wire so as to permit expansion of the composition to produce a cellular covering and cooling said expanded cellular covering after the extrusion. Preferably, the wire is heated prior to being covered by the composition. Conveniently, the cellular covering is cooled by passing the covered wire through a cooling medium, typically a water bath, positioned close to the front of the extrusion die. The ethylene polymer based compositions when extruded in this way process very well using conventional extrusion machinery with, at worst, only a negligible amount of "plate-out," and provide an insulation covering with good cellular and surface characteristics. The blown products exhibit a complete or at least, substantial absence of "plate-out." The blown products have a degree of expansion of about 30 to 55% as compared to the volume of the expandable composition.

The reasons for the good results obtained using the compositions of this invention are not entirely clear at the present time, but it is thought that the secondary blowing agent should have a higher decomposition temperature, and must be present in a smaller amount, than the azodicarbonamide.

The ethylene polymers

The ethylene polymers employed in the compositions of the present invention are low density ethylene polymers or mixtures of such polymers with a small proportion, usually in the range of about 1–30, more preferably about 1–6 parts by weight, per 100 parts by weight of the low density ethylene polymer, of a high density ethylene polymer or polypropylene.

Suitable low density ethylene polymers are homopolymers of ethylene and copolymers of ethylene with minor amounts, for example, up to 10% by weight, of one or more organic compounds copolymerisable therewith, such as those which contain polymerisable unsaturation, such as is present, for example, in compounds containing an ethylene linkage $>C=C<$, for example, styrene, vinyl stearate, vinyl acetate, vinyl formate, monobutyl maleate, acrylic acid, methacrylic acid, methyl methacrylate, ethyl acrylate, 2-ethyl hexyl acrylate, propylene, butene, isoprene, butadiene, bicycloheptene, bicycloheptadiene, and divinyl phosphonates. Many other copolymerisable monomers are well known in the art. Low density ethylene polymers in the compositions of this invention range in density (at 20° C.) from about 0.915 to about 0.935, and preferably from about 0.924 to about 0.930, with a melt flow index not above 7, and preferably not above 2 grams per 10 minutes.

The high density ethylene polymers which may be present, in small proportions, in the compositions of this invention have a density above 0.939, preferably above 0.944, and a melt flow index not above 20, and preferably not above 6 grams per 10 minutes. The high density ethylene polymers are prepared by polymerising ethylene and, if desired, minor amounts, e.g. 0.5 to 10% of an alpha olefin copolymerisable therewith, such as butene-1, utilising the conventional low pressure methods which have been practiced for many years. Polypropylenes having the desired properties may, if desired, be included in the compositions as a substitute for or, in mixtures with, the high density ethylene polymers. The polypropylene is a solid material having a density of about 0.905±0.005 and a melt flow index of up to about 10 grams per 10 10 minutes.

Blowing agent

The preferred mixed blowing agent system is one containing a major amount of azodicarbonamide and, as the secondary blowing agent, a minor amount of trihydrazino-sym-triazine. The latter material has an optimum decomposition temperature in the range 265–290° C. Azodicarbonamide has a decomposition temperature range of 190–230° C. Advantageously, the ratio in parts by weight of the azodicarbonamide to the trihydrazino-sym-triazine or other secondary blowing agent(s) in the mixture is in the range 60:1 to 1.01:1, preferably 6:1 to 3:1, respectively. The amount of the blowing agent mixture present in the compositions may vary over a fairly wide range depending, among other things, on the density desired for the cellular covering obtained on extrusion. Generally, the amount present will be in the range of about 0.1 to about 5 parts by weight per 100 parts by weight of the total polymer weight. In many instances, it is preferred to employ from between about 0.5 to about 2 parts by weight per 100 parts by weight of the total weight of polymers.

Adjuvants

In addition to the polymers and the mixed blowing agent system, the compositions of the present invention advantageously include a lubricant to facilitate extrusion, a nucleating agent to assist in the development of the cellular structure on extrusion and a suitable high temperature anti-oxidant.

Suitable lubricants include fatty acids such as stearic acid, esters and semi-esters of such acids, mineral oils and natural and synthetic waxes. We find that best results, both from the standpoint of ease of processing and cellular properties, are obtained using 13-docosenamide. Typically, the lubricant is present in amounts of between 0.001 and about 1, preferably between about 0.02 and about 0.05, parts by weight per 100 parts by weight of the polymers employed.

The nucleating agent should be inert towards both the polymer and blowing agent under the extrusion conditions, and should also be insoluble in the polymer. Metal oxides such as silica, titania, alumina, zirconia, barium oxide, magnesium oxide and metal salts such as sodium chloride, potassium bromide and calcium carbonate are suitable. It is essential that the nucleating agent be finely divided and uniformly dispersed throughout the composition. In general, the particle size of the nucleating agent should be smaller than 1 micron and preferably in the range of 0.001 to 0.5 microns. One useful nucleating agent is that commercially available under the Registered Trademark "Winnofil S," with an average particle size of less than 1 micron, and which is believed to be a coated calcium carbonate. The concentration of the nucleating agent desirable to achieve uniform nucleation varies with the degree of dispersion. Typically, however, it is present in an amount ranging from about 0.01 to about 2, preferably 0.02 to 1, parts by weight per 100 parts by weight of the resins employed.

Suitable anti-oxidants for inclusion in the compositions of this invention include di-butyl-p.-cresol and other commercially available materials such as Topanol C.A., Santonox and Nonox. These materials are chemically, 1,1,3-tris(2 - methyl-4-hydroxy-5-tertiary butylphenyl)butane, 4,4' - thiobis-6-tertiary butylmeta cresol and 2,2'-methylene-bis-[6-(1-methylcyclohexyl)-4-methylphenol], respectively.

Other additives may be included in the compositions such, for example, as fillers, extenders, pigments or other colouring matter, modifiers and opacifiers.

The adjuvants or additives selected for use in each case are those which are normally employed with the particular type of expandable plastic being used. The adjuvants would be used in amounts which would be effective for the intended purpose. Thus, stabilizers would be used in a stabilizingly effective quantity and fillers would be used in effective quantities therefor. For example, if a reinforcing filler were to be used, such filler would be used in such amounts as to provide the desired reinforcing effect.

A highly preferred expandable composition provided by this invention is one containing the following components in amounts falling within the ranges quoted.

| Component: | Amount (parts by wt.) |
|---|---|
| Low density (0.924 to 0.930) polyethylene | 90–98 |
| High density (0.944 to 0.950) ethylene copolymer | 2–10 |
| Azodicarbonamide: Mixed blowing Agent system | 0.3–1.0 |
| Trihydrazino-sym-triazine | 0.05–0.4 |
| 13-docosenamide (lubricant) | 0.02–0.05 |
| Nucleating agent (e.g. "Winnofil S" with a particle size <1 micron) | 0.02–1 |
| Anti-oxidant | 0.05–0.5 |

Processing

When all the solid components of the expandable composition are available in the form of a powder, or as small particles, the compositions are most conveniently prepared by first making a blend of the components, say in a Banbury mixer or a continuous extruder, and then masticating this blend on a heated mill, for instance, a two-roll mill, and the milling continued until an intimate mixture of the components is obtained. Alternatively, a master batch containing the mixed blowing agent system and, if desired, some or all of the other components, may be added to the mass of ethylene polymer. Where the polymer is not available in powder form, the compositions may be made by introducing the polymer to the mill, masticating it until it forms a band around one roll, after which a blend of the remaining components is added and the milling continued until an intimate mixture is obtained. The rolls are preferably maintained at a temperature within the range 80° C. to 150° C. The composition in the form of a sheet is removed from the mill and then brought into a form, typically dice like pieces, suitable for subsequent processing.

The invention is further illustrated by the following examples in which all parts are by weight unless indicated otherwise. The melt flow index describes the flow behaviour of a polymer at a specified temperature and under a specified pressure. The values quoted in the examples and elsewhere in this application, are determined by measuring the flow rate, expressed in grams per 10 minutes, according to the procedure of British Standard 2782, part 1, 1965, Method 105C.

EXAMPLE 1

An expandable composition of the following formulation was prepared:

| Component: | Content |
|---|---|
| Low density polyethylene (density 0.928; melt flow index 1.0) | 95 |
| High density ethylene copolymer (density 0.950; melt flow index 4.0) | 5 |
| Azodicarbonamide (primary blowing agent) | 0.6 |
| Trihydrazino-sym-triazine (secondary blowing agent) | 0.2 |
| 13-docosenamide (lubricant) | 0.03 |
| "Winnofil S" (nucleating agent) | 0.05 |
| Di-butyl-p.-cresol (anti-oxidant) | 0.2 |

The components were thoroughly mixed in a Banbury mixer, and the mixture passed through a two-roll mill operating at a front roll pressure of 50 pounds per square inch gauge pressure (p.s.i.g.) (steam) at 148° C. and a back roll pressure of 35 p.s.i.g. (steam) at 138° C. to form a sheet approximately 0.125″ thick. The sheet coming from the mill was cooled, and then fed to a dicing machine in which it was reduced to ⅛″ cubes. The cubes were then fed into a 2″ extruder fitted with a standard wire crosshead and a die with a single circular 0.030″ diameter aperture operating at a temperature of around 230° C., a compression ratio of 4:1 and a screw speed of 50 r.p.m. The molten expandable composition on emerging from the die contacted a 0.020″ diameter copper wire, preheated to 100° C. and travelling at 2,500 feet per minute. With the change in pressure on emerging from the die, the composition expands to provide a cellular covering. The covered wire was taken through a water bath maintained at 20° C. located in front of the die so that the travel of the wire from the die to the cooling medium is about 12″. The cellular covering had a density (at 20° C.) of 0.6 gm./cc. and a radial thickness of 0.008″, corresponding to a degree of expansion of around 36%. The wire coated with this cellular composition had a perfectly smooth surface both to the eye and to the touch, and good electrical and mechanical properties. Microscopic examination of cross-sections of the covered wire showed a fine and uniform cellular structure with a predominant cell diameter range of 0.0008 to 0.0012″. There was no "plate-out" even after operating continuously over prolonged periods. Pigmenting this composition did not affect surface smoothness.

EXAMPLE 2

This example is included for comparative purposes so as to illustrate the advantages associated with the blowing agents of this invention:

Part (a)

An expandable composition having the following formulation was prepared.

| Component: | Content |
|---|---|
| Low density polyethylene (density 0.928; melt flow index 1.0) | 100 |
| Azodicarbonamide | 0.6 |
| Di-butyl-p.-cresol | 0.2 |

Part (b)

An expandable composition having the following formulation was prepared.

| Component: | Content |
|---|---|
| Low density polyethylene (density 0.928; melt flow index 1.0) | 100 |
| Azodicarbonamide | 0.2 |
| Trihydrazino-sym-triazine | 1.0 |
| Di-butyl-p.-cresol | 0.2 |

In this (b) formulation, the trihydrazino-sym-triazine is present in a larger amount than the azodicarbonamide.

Part (c)

An expandable composition having the following formulation was prepared.

| Component: | Content |
|---|---|
| Low density polyethylene (density 0.928; melt flow index 1.0) | 100 |
| Azodicarbonamide ("Genitron A.C.") | 0.6 |
| p,p′ - oxy - bis(benzene sulphonylhydrazide) ("Genitron O.B.") | 0.1 |
| Di-butyl-p.-cresol | 0.2 |

In this (c) formulation, the secondary blowing agent, i.e. p,p′-oxy-bis(benzene sulphonyl hydrazide), has a lower decomposition temperature (150–160° C.) than the azodicarbonamide.

Part (d)

An expandable composition having the following formulation was prepared.

| Component: | Content |
|---|---|
| Low density polyethylene (density 0.928; melt flow index 1.0) | 100 |
| Azodicarbonamide | 0.6 |
| Trihydrazino-sym-triazine | 0.1 |
| Dibutyl-p.-cresol | 0.2 |

Part (e)

An expandable composition having the following formulation was prepared.

| Component: | Content |
|---|---|
| Low density polyethylene (density 0.928; melt flow index 1.0) | 80 |
| High density polyethylene (density 0.960; melt flow index 0.9) | 20 |
| Azodicarbonamide | 0.6 |
| P-toluene sulphonyl semi carbazide ("Celogen RA") | 0.2 |
| 13-docosenamide | 0.03 |
| Di-butyl-p.-cresol | 0.2 |

In this formulation the secondary blowing agent, i.e. Celogen RA, has a higher decomposition temperature than the azodicarbonamide.

These compositions were then extruded, and expanded, around copper wire following the procedure set forth in Example 1. The observativons recorded in Table I below were made on the covered wire after processing had been under way for 4 hours:

TABLE I

| Feature | Part (a) | Part (b) | Part (c) | Part (d) | Part (e) |
|---|---|---|---|---|---|
| "Plate-out" | Very marked especially on final channels and screw flights. | None | Moderate amount especially on final channels and screw flights. | None | Very marked especially on final channels and screw flights. |
| Surface characteristics. | Markedly rough and significant eccentricity. | Fairly rough | Fairly rough | Smooth both to the eye and touch. | Smooth both to eye and touch. |
| Cellular characteristics. | Fine and uniform cell structure predominant cell diameter 0.0004 to 0.001". | Coarse, uneven cell structure with many large voids, average cell diameter >0.002". | Coarse, uneven cell structure, average cell diameter >0.003". | Fine, uniform cell structure with an absence of large voids, predominant cell diameter 0.0008 to 0.0012". | Predominant cell diameter 0.0004 to 0.001". |

The results reported show that the combination of good processing properties and cellular characteristics is obtained only with the expandable composition of part (d) which contains a major amount of azodicarbonamide and a minor amount of trihydrazino-sym-triazine. It also shows that p-toluenesulphonyl semi carbazide is not suitable for use as the second blowing agent.

What is claimed is:

1. An expandable composition adaptable for electrical conductor insulation applications in expanded form and comprising
   (a) low density ethylene polymer having a density of from about 0.915 to about 0.935 and a melt flow index $\leq 7$ grams per 10 minutes,
   (b) about 1 to 30 parts by weight, per 100 parts by weight of said low density ethylene polymer, of high density ethylene polymer having a density of $>0.939$ and a melt flow index $\leq 20$ grams per 10 minutes, and
   (c) blowing agent effective quantities of a blowing agent system comprising a major portion by weight of azodicarbonamide and a minor portion by weight of trihydrazino-sym-triazine.

2. An expandable composition as in claim 1 which further comprises effective quantities of lubricant, nucleating agent and anti-oxidant.

3. An improved process for utilizing azodicarbonamide as a blowing agent for expanded ethylene polymer based compositions and which is characterized in part by the substantial absence, at least, of "plate-out" which comprises
   expanding an ethylene polymer based composition which comprises
   (a) low density ethylene polymer having a density of from about 0.915 to about 0.935 and a melt flow index $\leq 7$ grams per 10 minutes, and
   (b) about 1 to 30 parts by weight, per 100 parts by weight of said low density ethylene polymer, of high density ethylene polymer having a density of $>0.939$ and a melt flow index $\leq 20$ grams per 10 minutes, with blowing agent effective quantities of a blowing agent system comprising a major portion by weight of azodicarbonamide and a minor portion by weight of trihydrazino-sym-triazine.

4. A process as in claim 3 further comprising insulating an electrical conductor with the expanded composition.

5. An expandale composition as in claim 1 which comprises, per 100 parts by weight of said low density ethylene polymer, about 2 to 10 parts by weight of said high density ethylene polymer and 0.1 to 5 parts by weight of said blowing agent system.

6. An expandable composition as in claim 5 in which said azodicarbonamide and said trihydrazino-sym-triazine are present in said blowing agent system in a ratio of 60:1 to 1.01:1, respectively.

7. An expandable composition as in claim 6 in which said ratio is 6:1 to 3:1.

References Cited

UNITED STATES PATENTS

| | | | |
|---|---|---|---|
| 3,211,677 | 10/1965 | Feild et al. | 260—2.5 P |
| 3,254,139 | 5/1966 | Anderson et al. | 260—2.5 E |
| 3,278,466 | 10/1966 | Cram et al. | 260—2.5 P |
| 3,375,303 | 3/1968 | Joyce | 117—232 |

MURRAY TILLMAN, Primary Examiner

W. J. BRIGGS, Sr., Assistant Examiner

U.S. Cl. X.R.

117—232; 260—2.5 R, 897

PO-1050
(5/69)

UNITED STATES PATENT OFFICE
CERTIFICATE OF CORRECTION

Patent No. 3,645,930          Dated February 29, 1972

Inventor(s) J. K. Normanton

It is certified that error appears in the above-identified patent and that said Letters Patent are hereby corrected as shown below:

Column 5, lines 9-11: "Trihydrazino-sym-triazine" should be included within the bracketed "Mixed blowing Agent system".

Signed and sealed this 11th day of July 1972.

(SEAL)
Attest:

EDWARD M. FLETCHER, JR.
Attesting Officer

ROBERT GOTTSCHALK
Commissioner of Patents